Oct. 28, 1969 L. G. KIRKEGAARD 3,474,538
GEOMETRY TEACHING AID
Filed Feb. 13, 1968
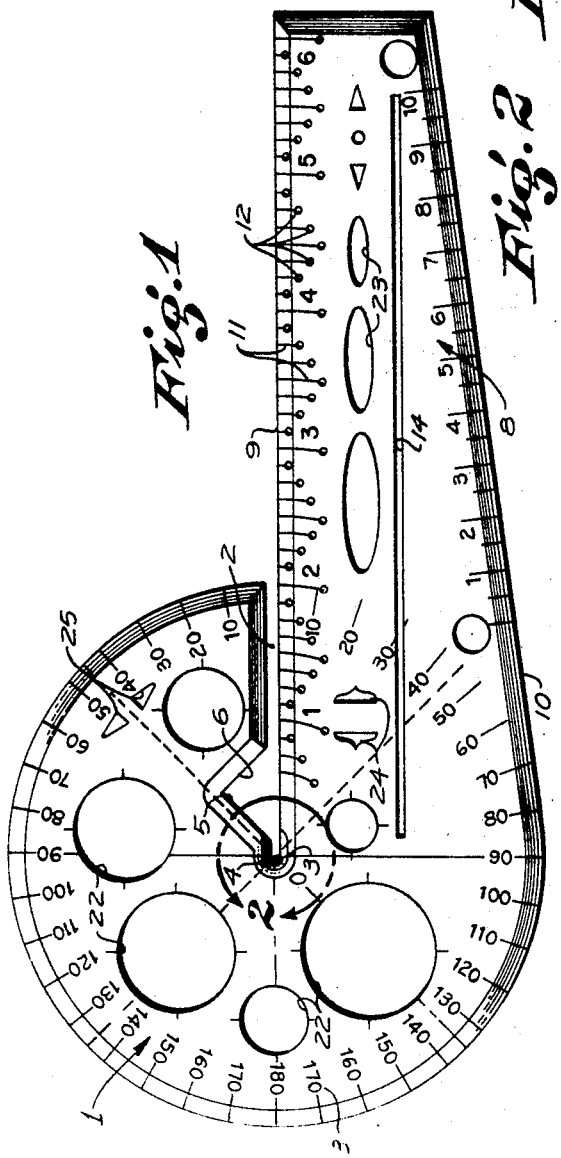
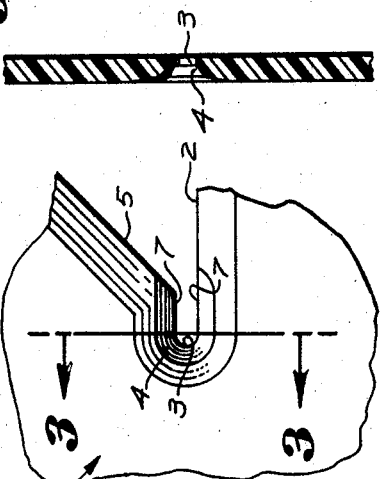
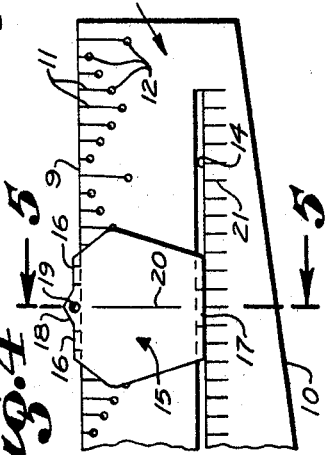
INVENTOR.
LEONARD G. KIRKEGAARD
BY
*Lyon+Lyon*
ATTORNEYS

United States Patent Office 3,474,538
Patented Oct. 28, 1969

3,474,538
GEOMETRY TEACHING AID
Leonard G. Kirkegaard, Saratoga, Calif., assignor to Kirk-Gaard, Inc., a corporation of California
Filed Feb. 13, 1968, Ser. No. 705,113
Int. Cl. G01c *21/20;* G01b *3/14, 5/24*
U.S. Cl. 33—1
2 Claims

ABSTRACT OF THE DISCLOSURE

A geometry teaching aid which includes a circular transparent plastic plate having a protractor scale and from a quadrant of which extends an integral transparent arm, one edge of which is tangent to the plate, the other edge of which is radial and forms a continuation of a radial slit in the plate. The radial slit terminates at the center of the plate and there forms a semi-circular journal dimensioned to receive a pencil tip. A triangular opening borders the slit near the radially inner end of the slit to facilitate access of a pencil tip to the journal. The arm is provided with a radii scale and a set of pencil tip receiving perforations permits the scribing of circles of different diameter. Also a slide is fitted on the arm and has a pencil tip perforation for scribing circles.

BACKGROUND OF THE INVENTION

This application is a continuation-in-part of a copending application, Ser. No. 653,803, filed July 17, 1967, now abandoned.

Various measuring and drawing instruments have been made which involve generally a protractor having a radial arm such as shown in the following patents: Saunders et al., 618, 135; Chisholm, 29,967; Rossi (Italy), 913,545. These have been intended for use by trained persons such as draftsmen, navigators and the like. These instruments have not been satisfactory as a teaching aid; for example, to teach geometry and related subjects and be readily used by unexperienced students to draw various geometrical shapes, vector diagrams, stress diagrams and other mathematical figures.

SUMMARY OF THE INVENTION

The present invention is intended primarily for use as a teaching aid; however, the invention has other uses.

A primary object is to provide an instrument including a protractor and a radial arm which is easily manipulated by an inexperienced student to draw various geometrical figures, and diagrams associated with mathematical problems.

A further object is to provide a particular convenient means whereby the instrument may be guided along a pencil point pressed against an underlying paper until the center of rotation of the instrument coincides with the pencil point.

A further object is to provide, in conjuction with the radial arm, a slide which permits the drawing of circles of any selected diameter, within the dimensions of the instrument, thus eliminating the need of a compass, the slide also serving as a measuring reference and permitting conversion of measuring units from one scale to another.

A further object is to provide a conveniently arranged set of radially spaced perforations for drawing circles or arcs of predetermined radii.

A still further object is to provide an instrument which, although primarily intended for student use, is also capable of more complex use such as required for mechanical drawings or perspective drawings.

DESCRIPTIONS OF THE DRAWINGS

FIGURE 1 is a plan view of the geometry teaching aid with the principal divisions of the scales indicated.

FIGURE 2 is an enlarged fragmentary plan view taken within circle 2 of FIGURE 1.

FIGURE 3 is an enlarged fragmentary sectional view taken through 3—3 of FIGURE 2.

FIGURE 4 is a fragmentary plan view of the geometry teaching aid showing a slide mounted thereon.

FIGURE 5 is an enlarged sectional view taken through 5—5 of FIGURE 4.

The geometry teaching aid includes a circular plate 1 having a radial slit 2 which extends to the center. At the center of the plate the slit terminates in a semi-circular journal 3 having a bevelled margin 4.

One side of the radial slit 2 at a point outwardly from the journal 3 is provided with a triangular opening 5 having a 90° apex 6. The radially inner side of the triangular opening terminates close to but radially outward from the circular journal 3 and the radial slit between the opening 5 and the journal 3 is relatively narrow such that its side walls 7 are tangent to the extremities of the circular journal 3 as shown best in FIGURE 2. As a consequence, the plate may be guided along a pencil tip pressed against a paper surface until the pencil tip is received in the circular journal 3. This may be accomplished with great facility even by one having little practice.

An arm 8 extends from the plate 1. The root end of the arm occupies essentially one-quarter of the plate. The arm includes a radial edge 9 forming a continuation of one side of the radial slit 2 and a tangential edge 10, that is, an edge which extends tangentially from the plate 1 and converges toward the extremity of the arm.

The radial edge 9 of the arm is bevelled and is provided with a radii scale 11; that is, a scale formed by a series of arcuate lines having their centers at the center of the journal 3. Each line of the scale 11, or selected lines, terminates in a pencil receiving perforation 12. The perforations are placed at different distances inwardly from the edge of the arm so that they will not interfere or intersect each other. The perforations are intended for drawing circles or arcs of different radii.

The periphery of the plate 1 is provided with a protractor scale 13 one quadrant of which extends across the root end of the arm 8.

The arm 8 is provided with a slot 14 which is parallel to the radial edge 9. A slide 15 bridges between the edge 9 and the slot 14. One end of the slide is provided with a pair of spaced clamp lugs 16 which overlie the radial edge 9 of the arc. The opposite end of the slide is provided with a centrally located clamp lug 17 which fits into the slot 14. Between the clamp lugs 16, the slide 15 is provided with a small projection 18 which forms a pointer and within the projection 18 is provided with a pencil tip receiving perforation 19. A reference line 20 extends from the perforation across the slide. The slide is bowed between the lugs 16 and 17 so that the lugs tend to grip the arm 8 between the edge 9 and the slot 14. By pressing downwardly on the slide the clamping action of the lugs 16 and 17 is relieved so that the slide may be moved freely along the arm 8.

As indicated in FIGURE 4 a conversion scale 21 may be provided along a margin of the slot 14 and be used in conjunction with the slide 15.

The various portions of the plate and the arm which are not occupied by scales are provided with circular openings 22, elliptical openings 23, a pair of bracket template openings 24 and sets of narrow template openings 25.

The tool is intended primarily for the drawing of geometric figures required in the study of geometry. It is also particularly useful in drawing vector diagrams and for drawing circles of various diameters. By reason of the particular construction of the journal 3, the construction of various geometric figures, or the like, is greatly facilitated. One can locate a point on a work sheet and then quickly bring the journal 3 into contact with the pencil so that the tool may be rotated to any desired angular position and, as quickly, the tool may be moved to another location for the drawing of a line from the point or for drawing a circle. In the latter case, a second pencil is inserted in the appropriate perforation 12 or in the perforation 19 provided in the slide 15.

While the instrument is intended primarily as a geometry teaching aid, it is not limited thereto; that is, the instrument may be used as a drafting tool including the drawing of perspective views; or with proper scales is useful as a plotting tool for navigation charts.

While particular embodiments of this invention have been shown and described, it is not intended to limit the same to the details of the constructions set forth, but instead, the invention embraces such changes, modifications and equivalents of the various parts and their relationships.

I claim:
1. A geometry teaching aid, comprising:
   (a) a circular plate having a radial slit terminating in a journal occupying a part circle tangent thereto, said journal dimensioned to receive a pencil tip thereby to pivot said plate about a point;
   (b) an integral arm in the same plane as said plate and extending therefrom, the root end of said arm occupying a quadrant of said plate, one edge of said arm forming a radial edge coinciding with an edge of said radial slit whereby said pencil tip may be moved continuously along said radial edge into said radial slit and be received in said journal, and the opposite edge of said arm extending tangentially from the edge of said circular plate and converging toward said radial edge;
   (c) said arm having a longitudinal slit parallel to said radial edge;
   (d) and a slide including clamping lugs which grip the radial edge of said arm and a corresponding edge of said longitudinal slit and a bowed plate joining said lugs and forming a leaf spring to cause said lugs to clamp said edges, said plate being depressible to relax the clamping force of said lugs.

2. A geometry teaching aid, comprising:
   (a) a circular plate having a radial slit terminating in a semicircular journal, the opposite extremities of which are tangent to the opposite sides of said radial slit, said journal dimensioned to receive a pencil tip thereby to pivot said plate about a point defined by said pencil tip;
   (b) said radial slit being enlarged at one side to define a triangular opening defining an apex and sloping sides terminating at said radial slit, the radially inner sloping side forming a guide to facilitate movement of said plate past a pencil point until said pencil point is received in said journal.

References Cited

UNITED STATES PATENTS

| | | | |
|---|---|---|---|
| 618,135 | 1/1899 | Saunders et al. | 33—75 |
| 2,011,282 | 8/1935 | Hochman. | |
| 2,178,962 | 11/1939 | Gottschalk. | |
| 2,366,019 | 12/1944 | Golden | 33—75 |
| 2,428,310 | 9/1947 | Hendry. | |
| D. 166,905 | 6/1952 | Coates. | |
| 2,614,329 | 10/1952 | Almorth | 33—75 |
| 2,906,024 | 9/1959 | Smith. | |
| 3,020,642 | 2/1962 | Rickey. | |
| 3,289,299 | 12/1966 | Elger. | |

FOREIGN PATENTS

| | | |
|---|---|---|
| 56,864 | 4/1911 | Switzerland. |

HARRY N. HAROIAN, Primary Examiner

U.S. Cl. X.R.

33—27, 75